United States Patent [19]

Orita

[11] Patent Number: 4,774,392
[45] Date of Patent: Sep. 27, 1988

[54] LASER CUTTING METHOD FOR HIGH CHROMIUM STEEL AND A DEVICE TO CARRY OUT THAT METHOD

[75] Inventor: Naoki Orita, La Habra, Calif.

[73] Assignee: Amada Engineering & Service Co., Inc., La Mirada, Calif.

[21] Appl. No.: 723,875

[22] Filed: Apr. 16, 1985

[51] Int. Cl.[4] .............................................. B23K 26/00
[52] U.S. Cl. ............................ 219/121.63; 219/121.84
[58] Field of Search ...... 219/121 L, 121 LG, 121 FS, 219/121 LJ, 121 LC, 121 LD, 121 LN

[56] References Cited

U.S. PATENT DOCUMENTS

| | | | |
|---|---|---|---|
| 3,604,890 | 9/1971 | Mullaney et al. | 219/121 LG |
| 3,649,806 | 3/1972 | Konig | 219/121 LG |
| 4,031,351 | 6/1977 | Martin | 219/121 LG |
| 4,048,464 | 9/1977 | Gale et al. | 219/121 LG |
| 4,332,999 | 6/1982 | Wittke | 219/121 LJ |
| 4,467,171 | 8/1984 | Ramos | 219/121 LG |
| 4,538,756 | 9/1985 | Trenkler et al. | 156/81 X |
| 4,565,855 | 1/1986 | Anderson et al. | 524/544 X |

FOREIGN PATENT DOCUMENTS

| | | | |
|---|---|---|---|
| 2444110 | 8/1980 | France | 219/121 LG |
| 0136295 | 10/1981 | Japan | 219/121 LG |
| 0087995 | 5/1984 | Japan | 219/121 LG |
| 2094993 | 9/1982 | United Kingdom | 219/121 LG |

Primary Examiner—Thomas H. Tarcza
Assistant Examiner—John B. Sotomayor
Attorney, Agent, or Firm—Wigman & Cohen

[57] ABSTRACT

The present invention relates to a method and device for cutting a workpiece made from a high chromium material such as stainless steel. The device comprises a processing head to irradiate and focus a laser beam onto a workpiece, a nozzle connected to the processing head for spraying and assisting gas onto the workpiece, a storage tank for storing a carbonate, and an orifice device for drawing carbonate from the storage tank so that it may be fed into the nozzle and sprayed onto the workpiece with the assisting gas. The addition of carbonate to the assist gas prevents excess dross from adhering to the cut surface of the workpiece.

11 Claims, 1 Drawing Sheet

LASER CUTTING METHOD FOR HIGH CHROMIUM STEEL AND A DEVICE TO CARRY OUT THAT METHOD

BACKGROUND OF THE INVENTION

1. Field of the Invention

The present invention relates to a method and a device for cutting a workpiece made from a high chromium material such as stainless steel, or tool steel, with a laser beam, and, in addition, relates to a cutting method and device for reducing the amount of dross adhering to the cut surface of the workpiece.

2. Description of the Prior Art

For example, technology utilizing laser beam irradiation to cut a high chromium steel, such as stainless steel or tool steel, which contains a relatively high content of chromium, usually operates in the same way as the case where a normal steel material is cut, whereby the laser beam is directed onto the workpiece, and at the same time an appropriate assist gas is sprayed on. When a laser beam is directed onto high chromium steel, and cuts that steel, materials such as high viscosity oxidized chromium, are produced, and a dross is formed on, and adheres to, the cut surface and the undersurface of the cut section of the workpiece. For this reason, it is very difficult to obtain a good quality cut surface.

OBJECTS AND SUMMARY OF THE INVENTION

The present invention was developed with the object of solving such problems as exist in the conventional procedures. The invention provides a laser cutting method and a device to utilize that cutting method to reduce the adherence of dross on the cut surface, even in the case of high chromium steel, whereby a good quality cut surface is obtained.

In the present invention, the cutting operation is carried out while a carbonate, such as sodium carbonate or sodium hydrogen carbonate, is being sprayed onto the portion of the high chromium steel which is being cut by the laser beam. In an operating device to carry out this operation, a processing head which concentrates a laser beam and directs it onto the workpiece is provided with a nozzle which sprays an assisting gas onto the processing section of the workpiece, and is also provided with a carbonate feeding device which feeds the carbonate into the assisting gas.

When the laser beam is irradiated onto a workpiece made from e.g. high chromium steel, the carbonate, such as sodium carbonate or sodium hydrogen carbonate, is sprayed against the cut surface of the high chromium steel while cutting is carried out. In this way, by spraying the carbonate against the cut section, the carbonate reacts with materials such as oxidized chromium, and the formation of materials such as highly viscous oxidized chromium is practically eliminated, and the adherence of dross to the cut surface and other portions of the workpiece is reduced.

BRIEF DESCRIPTION OF THE DRAWINGS

These and other objects, features, and advantages of the present invention will be more apparent from the following description of a preferred embodiment, taken in conjunction with the accompanying drawings, in which.

DETAILED DESCRIPTION OF THE PREFERRED EMBODIMENTS

Figure 1:
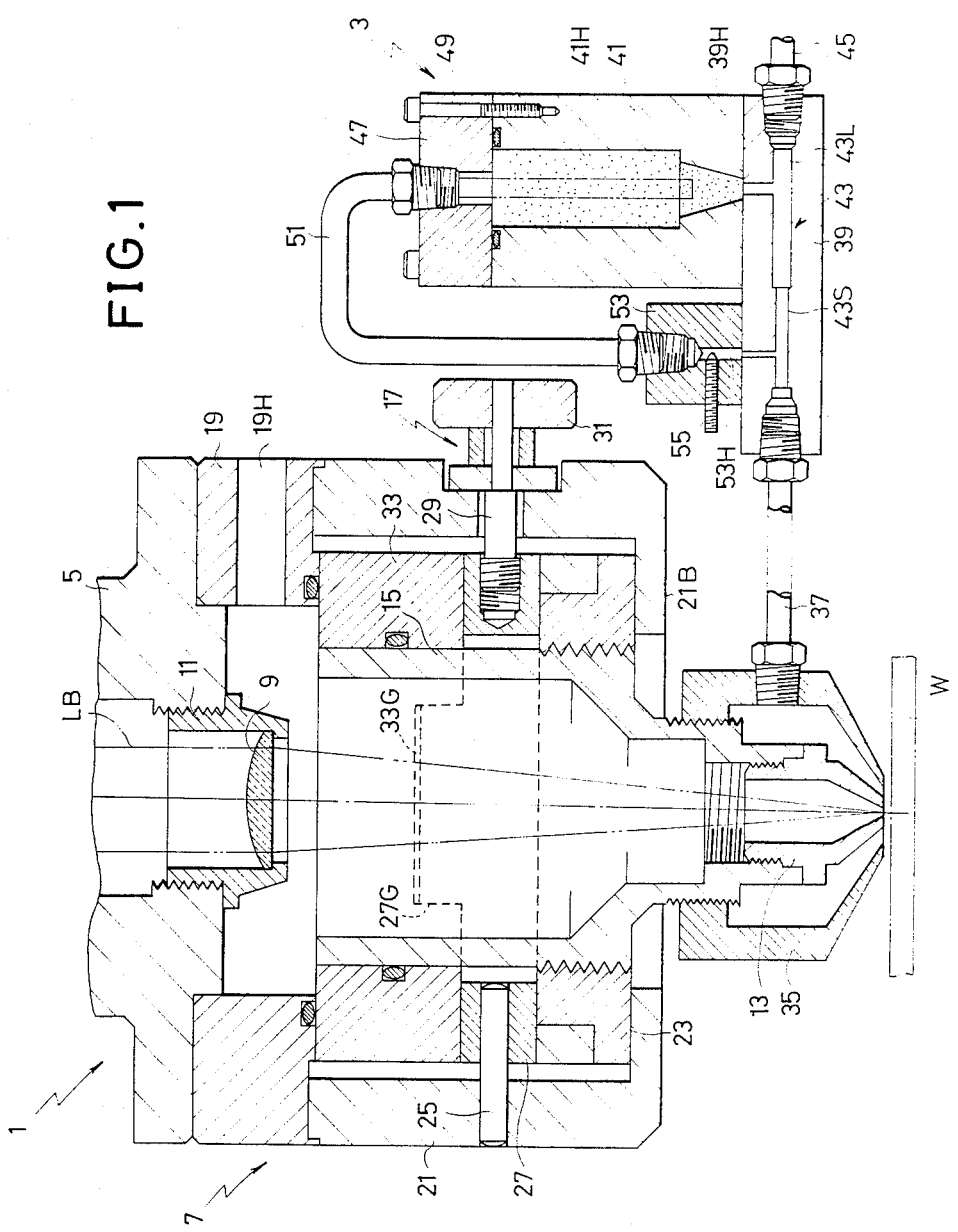
FIG. 1 is a cross-sectional view of one embodiment of the present invention.

Following is a description, with reference to the drawing, of one embodiment of the device of the present invention, which implements the laser cutting method of the present invention.

The device is comprised of a processing head 1 and a carbonate feed device 3.

The processing head 1 has a support tube 5 on a normal laser processing device, and a nozzle assembly 7. The support tube 5 mainly supports the nozzle assembly 7. A tubular lens holder 11, which maintains a focusing lens 9, is screwed into the support tube 5. The focusing lens 9 is used to concentrate a laser beam LB which is directed from a laser oscillator to a workpiece W.

The nozzle assembly 7 has a cylindrical nozzleholder 15 which is screwed into the lower end section of a main nozzle 13, and a regulating mechanism 17 which supports the cylindrical nozzle holder 15 in a freely adjustable position. This nozzle assembly 7 is removably installed on the support tube 5.

In more detail, a hole 19H for introducing an assisting gas is formed in a ring body 19 which is removably installed on the bottom surface of the support tube 5, for example, by a bolt or other suitable means. In addition, a cylindrical housing 21, on the lower section of which is formed an annular bottom section 21B, is integrally mounted, by some means such as a bolt, on the bottom surface of the ring body 19. Built into this housing 21 is a nut member 23 which is freely rotatable and slightly freely movable in a horizontal plane in the bottom section 21B, and supported on the bottom section 21B. The nozzle holder 15 is screwed into this nut member 23 so that the nozzle holder 15 is freely adjustable in the vertical direction. In other words, the main nozzle 13 is capable of being adjusted vertically by means of the nozzle holder 15 because of the fact that the nut member 23 is capable of suitably rotating.

The adjusting mechanism 17 is constructed in the following manner so that the position of the main nozzle 13 may be adjusted in the horizontal direction by means of the nozzle holder 15. That is, a first adjusting ring 27 for which the moving direction is controlled by means of a guide pin 25 installed horizontally in the housing 21, is positioned and supported on the upper surface of the nut member 23 so as to be freely adjustable in the left and right direction only with reference to FIG. 1. An adjusting screw 29 is screwed into the first adjusting ring 27 in order to adjust the position of the first adjusting ring 27. The adjusting screw 29 is installed parallel to the guide pin 25, and is supported in a freely rotatable manner in the housing 21. Accordingly, the first adjusting ring 27 can be adjusted so that it will move in the left-right direction in FIG. 1 by suitably rotating a nob 31 provided on the adjusting screw 29.

A second adjusting ring 33 holding the nozzle holder 15 is positioned and supported on the upper surface of the first adjusting ring 27. An indented guide section 33G is formed in the lower surface of the second adjusting ring 33 in a direction which intersects the direction of the adjustable movement of the first adjusting ring 27. The indented guide section 33G mates with a protruding guide section 27G which is formed on the upper surface of the first adjusting ring 27. Accordingly, the movement of the second adjusting ring 33 is adjustable only in a direction which intersects the direction of movement control of the first adjusting ring 27. The movement adjustment of the second adjusting ring 33 is performed by means of an adjustable screw in the same way as for the first adjusting ring 27.

As will be understood by the abovementioned construction, the main nozzle 13 can be adjusted in position through the medium of the nozzle holder 15 utilizing the movement adjustment of the first adjusting ring 27 and the second adjusting ring 33. The centerline of the laser beam LB and the centerline of the main nozzle 13 can be matched up. That is, the afore-mentioned problem is solved by decentering from the axis line of the laser beam LB the centerline of the assisting gas which is sprayed onto the work piece W from the main nozzle 13.

An auxiliary nozzle 35, which surrounds the main nozzle 13, is screwed onto the bottom section of the nozzle holder 15 in order to spray, for example, a suitable carbonate, such as sodium carbonate or sodium hydrogen carbonate onto the section of the workpiece W being cut by the laser beam LB. The auxiliary nozzle 35 is connected to the carbonate feed device 3 through a suitable connecting route 37, such as a pipe.

As indicated in FIG. 1, the carbonate feed device 3 is comprised of a base 39 and a tank body 41, which is fitted onto the base 39. A flow orifice 43, through which the assisting gas flows, penetrates into the base 39. The flow orifice 43 is divided into a large diameter section 43L and a small diameter section 43S. The large diameter section 43L is connected to the assisting gas source through a connecting tube 45. The small diameter section 43S of the flow orifice 43 is connected to the auxiliary nozzle 35 through the connecting route 37. Accordingly, part of the assisting gas from the assisting gas source, is fed through the base 39 to the auxiliary nozzle 35, and is sprayed onto the workpiece W by the auxiliary nozzle 35.

A storage cavity 41H is formed in the tank body 41 as a storage section for storing carbonate powder. The storage cavity 41H is connected to the large diameter section 43L through a communication orifice 39H which is drilled into the base 39. A lid member 47 is secured to the tank body 41 by a plurality of bolts 49, and one end of a suction tube 51 is connected to the lid member 47. It is desirable that the mouth of the suction tube 51 extends, as indicated in FIG. 1 by an alternate long and two short dashed line, close to the bottom of the storage cavity 41H. The other end of the suction tube 51 is attached to a flow adjusting block 53 mounted on the base 39. A connecting orifice 53H, connected to the small diameter section 43S of the flow orifice 43 which is drilled into the base 39, is provided on the flow adjusting block 53. A freely adjustable adjusting screw 55, which throttles the connecting orifice 53H, is screwed into the flow adjusting block 53.

With the above configuration, if part of the assisting gas is flowing through the flow orifice 43 in the base 39 of the carbonate feed device at the time that the assisting gas from the main nozzle 13 is being sprayed while the laser beam LB is being directed onto the workpiece W to cut the workpiece W, the assisting gas is also caused to spray onto the workpiece W from the auxiliary nozzle 35. When the assisting gas flows through the flow orifice 43 in the base 39 as previously described, a pressure drop occurs because the storage cavity 41H in the tank body 41 is attached to the large diameter section 43L of the flow orifice 43 while the flow adjusting block 53 is attached to the small diameter section 43S. As a result, the carbonate powder in the storage cavity 41H is drawn through the suction tube 51.

Accordingly, the carbonate is caused to be mixed throughout the assisting gas which is emitted from the auxiliary nozzle 35 onto the workpiece W. Consequently, when the workpiece W is made of high chromium steel, the carbonate reacts with such materials as oxidized chromium in the cut section of the workpiece and the formation of high viscosity oxidized chromium is curtailed. Thus the adherence of oxidized chromium in the form of dross to areas such as the cut portion of the workpiece can be reduced.

Furthermore, when a high chromium steel workpiece is being cut using the laser processing, it is not clear why there is a reduction in the dross which adheres to areas such as the cut surface when a carbonate, such as sodium carbonate or sodium hydrogen carbonate is sprayed onto the cut surface, but this fact has been confirmed through experience. This reduction of dross is believed to take place because the carbonate reacts with materials such as highly vscous oxidized chromium to form a material with low viscosity, so that the melted material is blown away by the assisting gas.

Other objects and further scope of applicability of the present invention will become apparent from the detailed description given above. It should be understood, however, that the detailed description of a specific example, while indicating a preferred embodiment of the invention, is given by way of illustration only, since various changes and modifications within the spirit and scope of the invention will become apparent from this detailed description to those skilled in the art.

For example, the configuration by which the auxiliary nozzle is omitted and the connecting route is connected to the main nozzle or to the nozzle holder is also acceptable.

In addition, the configuration by which the carbonate feed device is directly positioned in the flow route of the assisting gas which is emitted from the main nozzle is also satisfactory.

Furthermore, other types of configurations are possible, such as the configuration by which the carbonate powder drops by its own weight from the storage section in the carbonate feed device. That is to say, the present invention can exist in a large variety of embodiments.

What is claimed is:

1. A method for cutting high chromium steel with a laser comprising the steps of:
   irradiating and focusing a laser beam onto the high chromium steel;
   preparing an assisting gas and a carbonate for preventing chromium oxide from being formed in a cut portion of the high chromium steel;
   disposing a nozzle means comprising a first nozzle for allowing the laser beam to focus on the high chromium steel and ejecting the assisting gas to the high chromium steel, and a second nozzle disposed outside the first nozzle therearound and forming a space in cooperation with the first nozzle;
   disposing a tank for storing the carbonate, a flow orifice means connected to the tank therebelow and the assisting gas source, and a flow adjusting means connected to the flow orifice means and the tank through a suction tube;
   supplying the carbonate within the tank through the suction tube to the flow orifice means by the pressure drop between connecting portions of the flow orifice means connected to the tank and the flow adjusting means; and blowing a mixture of the assisting gas and the carbonate from the flow orifice means through the space of the nozzle means to the cut portion of the high chromium steel while the high chromium steel is cut by the irradiation of the laser beam.

2. The method according to claim 1, in which the carbonate is selected from the group consisting of sodium carbonate and sodium hydrogen carbonate.

3. The method according to claim 1, wherein the laser beam is irradiated through an inner nozzle and the carbonate is sprayed onto the cut section through an outer nozzle that is concentric to the inner nozzle.

4. The method according to claim 3, wherein the carbonate is mixed with an assist gas prior to spraying onto the cut section.

5. The method according to claim 4, wherein the carbonate is drawn from a storage section by the action of a pressure drop in the assist gas.

6. A laser cutting device comprising:
a processing head assembly for irradiating and focusing a laser beam onto a workpiece;
a nozzle means provided with the processing head assembly and having a first nozzle for allowing the laser beam to pass therethrough and a second nozzle disposed outside the first nozzle therearound and forming a space in cooperation with the first nozzle;
feeding means for feeding an assisting gas and a carbonate to the space between the first and second nozzles, said feeding means having a tank for storing the carbonate, a flow orifice means connected to an assisting gas source and the tank therebelow, a flow adjusting means connected to the flow orifice means and the tank through a suction tube, and supplying the carbonate within the tank through the suction tube to the flow orifice means by the pressure drop between connecting portions of the flow orifice means connected to the tank and the flow adjusting means, and a connecting means for connecting the flow orifice means to the second nozzle of the nozzle means and supplying the mixture of the assisting gas and the carbonate to the space between the first and second nozzle; and
means for blowing a mixture of the assisting gas and the carbonate from said space to a cut portion of the workpiece while the workpiece is cut by the irradiation of the laser beam.

7. The laser cutting device according to claim 6, wherein the carbonate is selected from the group consisting of sodium carbonate and sodium hydrogen carbonate powder.

8. The laser cutting device according to claim 7, further comprising a storage section for the carbonate from which the carbonate may be drawn by the action of a pressure drop in the assisting gas which flows through the feeding means.

9. The laser cuttig device according to claim 8, wherein the feeding means comprises a tank and a flow orifice having a large section and a small section.

10. The laser cutting device according to claim 9, wherein one end of the tank is connected to the large section of the flow orifice and an opposite end of the tank is connected to the small section of the orifice such that carbonate is drawn from the tank into the small section of the orifice when an assist gas passes through the orifice.

11. The laser cutting device according to claim 10, wherein the nozzle means is adjustable.

* * * * *